United States Patent
Jeong et al.

(10) Patent No.: US 8,613,125 B2
(45) Date of Patent: Dec. 24, 2013

(54) VACUUM CLEANER

(75) Inventors: Kyeong-Seon Jeong, Gimhae-si (KR);
Kyu-Chun Choi, Ulsan (KR);
Geun-Bae Hwang, Changwon (KR);
Chang-Hwa Sun, Changwon (KR);
Ju-Young Min, Changwon (KR);
Chung-Ook Chong, Changwon (KR)

(73) Assignee: LG Electronics Inc., Seoul (KR)

( * ) Notice: Subject to any disclaimer, the term of this patent is extended or adjusted under 35 U.S.C. 154(b) by 697 days.

(21) Appl. No.: 12/593,588

(22) PCT Filed: Mar. 14, 2008

(86) PCT No.: PCT/KR2008/001456
§ 371 (c)(1),
(2), (4) Date: Oct. 21, 2009

(87) PCT Pub. No.: WO2008/117945
PCT Pub. Date: Oct. 2, 2008

(65) Prior Publication Data
US 2010/0132149 A1    Jun. 3, 2010

(30) Foreign Application Priority Data

Mar. 28, 2007 (KR) .................. 10-2007-0030331
May 9, 2007 (KR) .................. 10-2007-0044793
May 9, 2007 (KR) .................. 10-2007-0044794
May 9, 2007 (KR) .................. 10-2007-0044795
May 9, 2007 (KR) .................. 10-2007-0044796
May 9, 2007 (KR) .................. 10-2007-0044797

(51) Int. Cl.
*A47L 5/00* (2006.01)
*A47L 7/00* (2006.01)

(52) U.S. Cl.
USPC .................. 15/319; 15/327.2; 15/DIG. 10

(58) Field of Classification Search
USPC .............. 15/DIG. 10, 340.1, 339, 327.2, 319
See application file for complete search history.

(56) References Cited

U.S. PATENT DOCUMENTS

| | | | |
|---|---|---|---|
| 6,789,640 B1 | 9/2004 | Arling et al. | |
| 2004/0015266 A1* | 1/2004 | Skoog | 700/245 |
| 2005/0065662 A1* | 3/2005 | Reindle et al. | 701/1 |
| 2005/0171639 A1 | 8/2005 | Uehigashi et al. | |
| 2007/0214596 A1* | 9/2007 | Bax | 15/339 |
| 2009/0038107 A1* | 2/2009 | Tiekoetter | 15/339 |

FOREIGN PATENT DOCUMENTS

| | | |
|---|---|---|
| DE | 10 2006 008 556 B3 | 8/2007 |
| JP | 3-82430 A | 4/1991 |
| JP | 4-189332 A | 7/1992 |
| JP | 2005-211462 A | 8/2005 |
| KR | 10-0175512 B1 | 2/1999 |
| KR | 10-1999-0048459 A | 7/1999 |
| KR | 10 0175797 B1 | 10/1999 |
| KR | 20-0381929 Y1 | 4/2005 |
| KR | 10-2005-0055516 A | 6/2005 |
| KR | 10-0492583 B1 | 6/2005 |
| KR | 10-0562545 B1 | 3/2006 |
| KR | 10-2007-0027840 A | 3/2007 |

* cited by examiner

*Primary Examiner* — Robert Scruggs
(74) *Attorney, Agent, or Firm* — Birch, Stewart, Kolasch & Birch, LLP

(57) ABSTRACT

The present embodiments relate to a vacuum cleaner. The vacuum cleaner according to present embodiments includes a main body; a wheel for moving the main body; a driving unit for driving the wheel; a sensor for sensing movement of the main body; and a controller for controlling the driving unit according to data sensed by the sensor.

16 Claims, 21 Drawing Sheets

VACUUM CLEANER

TECHNICAL FIELD

The present disclosure relates to a vacuum cleaner.

BACKGROUND ART

In general, a vacuum cleaner is an apparatus that uses suctioning force imparted by a suction motor installed in the main body to suction air including dust and filter the dust within the main body.

Such vacuum cleaners can largely be divided into canister vacuum cleaners that have a suctioning nozzle, for suctioning air including dust, that is provided separately from and connected through a connecting mechanism to a main body, and upright vacuum cleaners that have a suctioning nozzle formed integrally with the main body.

With a canister vacuum cleaner, cleaning is performed by moving the suctioning nozzle forward and backward or laterally without moving the main body, and with an upright vacuum cleaner, the main body moves simultaneously with the suctioning nozzle to perform cleaning.

DISCLOSURE OF INVENTION

Technical Problem

An object of the present disclosure is to provide a vacuum cleaner with a main body that can automatically move by means of a driving unit.

Another object of the present disclosure is to provide a vacuum cleaner capable of moving the vacuum cleaner main body in a direction in which a user performs cleaning, to facilitate cleaning by the user.

A further object of the present disclosure is to provide a vacuum cleaner with a main body capable of easily moving over obstacles on a floor.

Technical Solution

In one embodiment, a vacuum cleaner includes: a main body; a wheel for moving the main body; a driving unit for driving the wheel; a sensor for sensing movement of the main body; and a controller for controlling the driving unit according to data sensed by the sensor.

In another embodiment, a vacuum cleaner includes: a main body having one or more of a rotational center; a hose connector provided on the main body in a position apart from the rotational center; a wheel for moving the main body; a driving unit for driving the wheel; a sensor for sensing rotational movement of the main body; and a controller for controlling an operation of the driving unit according to data sensed by the sensor.

In a further embodiment, a vacuum cleaner includes: a main body having a rotational center; a wheel for moving the main body; a driving unit for driving the wheel; a sensor for sensing a change in distance between the main body and a surface to be cleaned, according to a rotation of the main body; and a controller for controlling an operation of the driving unit according to data sensed by the sensor.

In a still further embodiment, a vacuum cleaner includes: a main body provided with a first movement sensor and a plurality of wheels; a suctioning apparatus connected to the main body, to suction air including dust from a surface to be cleaned and transferring the suctioned air including dust to the main body; a second movement sensor provided on the suctioning apparatus; a driving unit for driving each of the wheels; and a controller for controlling an operation of the driving unit according to data sensed by each of the movement sensors.

Advantageous Effects

An advantage according to embodiments of the present disclosure is that because a vacuum cleaner main body can autonomously move in relation to the movement of a suctioning apparatus, a user does not have to exert force to move the vacuum cleaner main body.

Also, because a vacuum cleaner main body can autonomously move in a direction in which a user is cleaning, the user can more easily perform cleaning while moving over surfaces to be cleaned.

Additionally, because a vacuum cleaner main body can be moved by a driving unit, the vacuum cleaner main body can move more easily over obstacles on a floor.

MODE FOR THE INVENTION

Below, detailed descriptions of embodiments according to the present disclosure will be provided with reference to the drawings.

Figure 1:
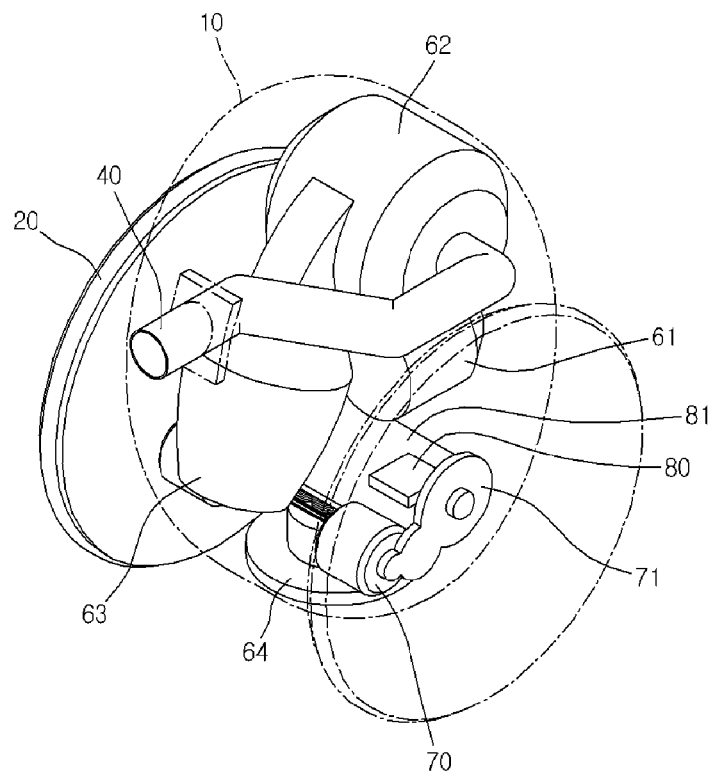
FIG. 1 is a perspective view of a vacuum cleaner according to a first embodiment of the present disclosure.
Figure 2:
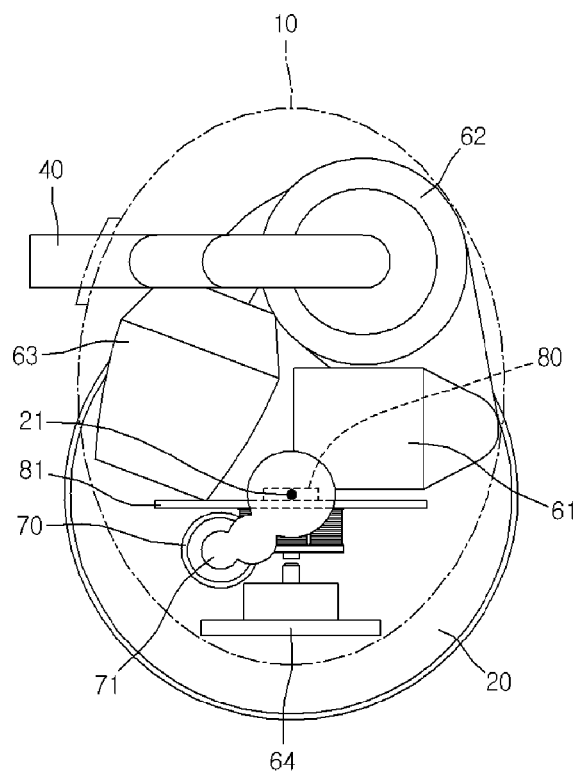
FIG. 2 is a side view of the vacuum cleaner.

FIG. 1 is a perspective view of a vacuum cleaner according to a first embodiment of the present disclosure, and FIG. 2 is a side view of the vacuum cleaner.

Referring to FIGS. 1 and 2, a vacuum cleaner according to the present embodiment includes a main body 10 provided with a suctioning motor 61 within, a pair of wheels 20 for moving the main body 10, a dust separating unit 62 for separating dust from air suctioned into the main body 10, and a dust container 63 for storing dust separated by the dust separating unit.

In detail, the main body 10 includes a pair of motors 70 for driving the pair of wheels 20, respectively, a gear unit 71 for transferring the driving force from the motors 70 to the wheels, a controller 81 for controlling the operation of the driving motor 70, and a chord reel 64 disposed below the suctioning motor.

The suctioning motor 61, the motors 70, the gear units 71, the chord reel 64, etc. may be disposed proximate to a rotating axis 21 of the wheels, in consideration of the center of gravity of the main body 10.

The controller 81 is provided with a sensor 80 for sensing the rotated angle of the main body 10. The sensor 80 employed may be an angle sensor.

A hose connector 40 is provided at the front, upper end of the main body 10, to which a connecting hose (to be described) is connected.

Figure 3:
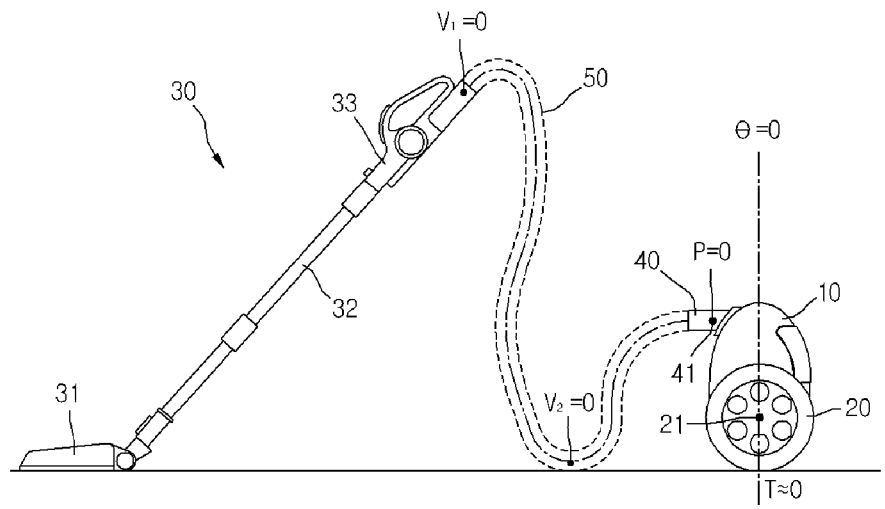
FIG. 3 is a side view of a vacuum cleaner in standby position according to the first embodiment.

FIG. 3 is a side view of a vacuum cleaner in standby position according to the first embodiment.

Referring to FIG. 3, a vacuum cleaner according to the present embodiment includes a suctioning apparatus 30 through which air including dust is suctioned from a surface to be cleaned and is relayed to the main body 10.

The suctioning apparatus 30 includes a suctioning nozzle 31 that suctions air including dust from a surface to be cleaned, an extension tube 32 connected to the suctioning nozzle 31 and adjustable in length, a handle 33 connected to the extension tube 32, a connecting hose 50 connected to the handle 33, and a hose coupler 40 for connecting the connecting hose 50 to the main body 10.

The hose coupler 40 projects a predetermined distance forward of the main body 10 when coupled to the main body 10.

In detail, when a user uses the suctioning nozzle 31, the extension tube 32, and the handle 33 to perform cleaning and directly imparts force to these components, the force is relayed to the hose coupler 40 through the connecting hose 50.

The hose coupler 40 functions as an intermediate medium to efficiently transfer movement of the connecting hose 50 (which is a non-rigid body) to the main body 10. If the connecting hose 50 is configured such that its rigidity increases closer to the main body 10, the protruded length of the hose coupler 40 must be shortened, or the hose coupler 40 may be omitted to still yield an efficient transfer of the overall movement of the hose coupler 40 to the main body 10.

However, the connecting hose 50 is typically made as a flexible structure to be able to buffer a certain amount of a user's movement during cleaning. Therefore, if the overall flexibility of the connecting hose 50 is designed to encompass its entirety, the hose coupler 40 having a predetermined length can efficiently transfer the movement.

The flexibility and innate weight of the connecting hose 50 in the present embodiment are coefficients that affect the movement transferred to the hose coupler 40.

Below, two coefficients will be described with respect to their technical significance.

First, with respect to the flexibility of the connecting hose 50, should the connecting hose 50 be a completely rigid body, this would signify that cleaning movements or moving thereof would directly be conveyed as-is to the hose coupler 40. Conversely, if the connecting hose 50 were a completely flexible material such as a thin string, while reverberation during cleaning would not occur, there would be no transfer of movement to the hose connector 40 until after a moving operation is completely performed—that is, after the connecting hose 50 is pulled straight.

Next, with respect to the innate weight of the connecting hose 50, assuming that the connecting hose has a certain amount of flexibility, if the connecting hose 50 were to be very heavy, a portion of the connecting hose 50 would always rest on the ground. Also, during cleaning, the portion of the connecting hose 50 touching the ground would barely move, and only the portion from the ground to the handle 33 (to the left of $V_2=0$ in FIG. 1) would move.

In this case, cleaning movements would not be relayed to the main body 10, while the portion from the ground to the center 41 of the hose coupler (to the right of $V_2=0$ in FIG. 1) would always be declined from the weight of the connecting hose 50.

Accordingly, as with the case in which the connecting hose 50 is a completely flexible member such as a thin string, the tilt of the hose coupler 40 would remain unchanged, regardless of whether cleaning is being performed.

Conversely, if the connecting hose 50 were very light, as in the case of the coupling hose 50 being a completely rigid body, the flexibility-to-weight ratio would render the hose essentially a rigid body, so that cleaning movements or moving thereof would be relayed as-is to the entire hose coupler 40.

Therefore, in order to make the vacuum cleaner move and change direction according to a user's wishes, cleaning movement of a user (from cleaning movements and moving) must be disregarded, and only movements of the user moving in geographic position must be transferred to the hose coupler 40. Therefore, there is a need to test different flexibilities and weights of hoses for the connecting hose 50 to select one suitable for the weight of the main body 10 and for reliability.

Further, not only must the weight of the connecting hose 50 be considered, but the hose coupler 40 and the weight of the main body must also be taken into account.

Referring to FIG. 3, when the vacuum cleaner is in a standby state, the connecting hose 50 does not have any separate movement, and the main body 10 is in a state where $\theta=0$.

Figure 4:
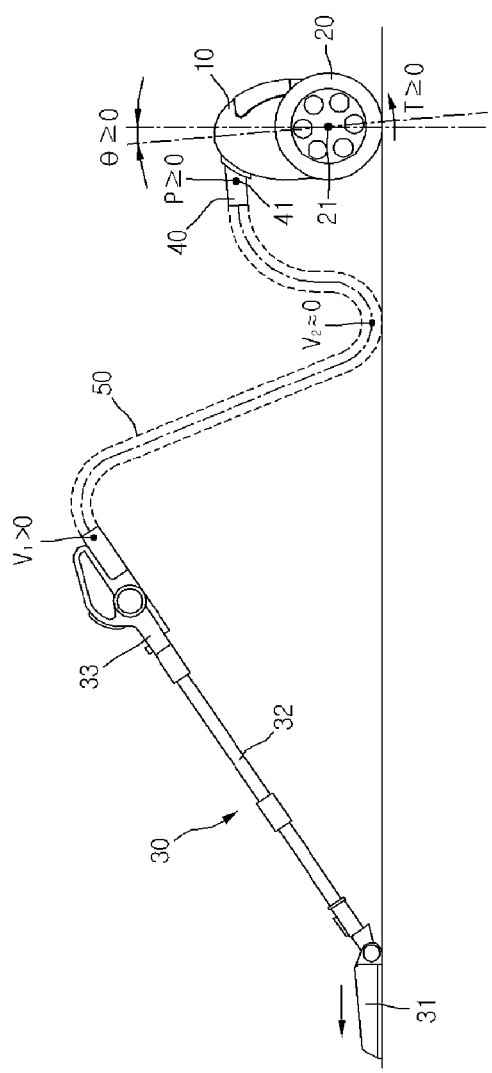
FIG. 4 is a side view of a vacuum cleaner when a user initiates cleaning.

FIG. 4 is a side view of a vacuum cleaner when a user initiates cleaning.

Referring to FIG. 4, the suctioning nozzle 31 is in a state pushed forward on a surface to be cleaned, so that the handle moves by $V_1>0$, and the movement of the handle 33 is largely absorbed by the portion of the connecting hose 50 in contact with the ground surface, at which $V_2 \approx 0$, so that only a nominal amount ($P \geq 0$) of the original force is transferred to the center of the hose coupler 40.

Here, the tilt of the main body is $\theta \geq 0$, but the actual tilt angle of the main body 10 is close 0.

Figure 5:
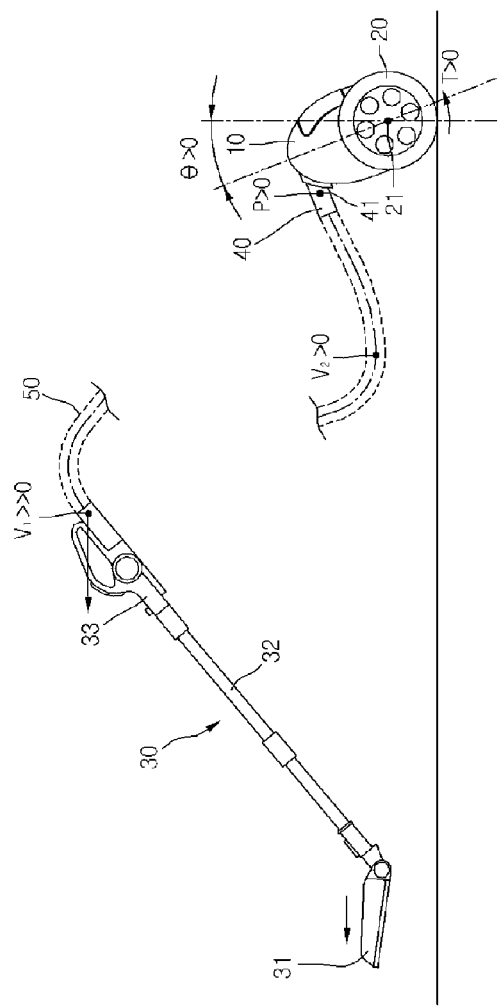
FIG. 5 is a side view of a vacuum cleaner with the suctioning apparatus moving forward.

FIG. 5 is a side view of a vacuum cleaner with the suctioning apparatus moving forward.

Referring to FIG. 5, the suctioning nozzle 31 is moved from a state separated from the surface to be cleaned. Of course, the suctioning nozzle 31 may be moved while against the surface to be cleaned.

Then, the handle 33 moves at a large velocity of $V_1>>0$, and the connecting hose 50 is separated from the surface to be cleaned. The lowest velocity of the connecting hose 50 separated from the ground surface is increased to $V_2>0$, and likewise, the overall movement of the connecting hose 50 exerts a force of $P>0$ on the center of the hose coupler 40.

The force $P>0$ causes a change in the tilt of the main body 10, or $\theta>0$. Here, the main body 10 tilts in a direction closer toward the suctioning nozzle 31.

Accordingly, in order for the main body 10 to maintain balance and follow the suctioning nozzle 31, a predetermined amount of rotational force $T>0$ must be applied to the wheels 20. That is, the controller 81 controls the operation of the motors 70 to rotate the wheels 20 in a direction to move the main body 10 forward.

The wheels 20 are rotated forward by means of the rotating force T, so that the main body 10 retains balance and does not topple, the connecting hose 50 follows the suctioning nozzle 31, and the user does not have to exert a large amount of force to pull the main body 10.

Figure 6:
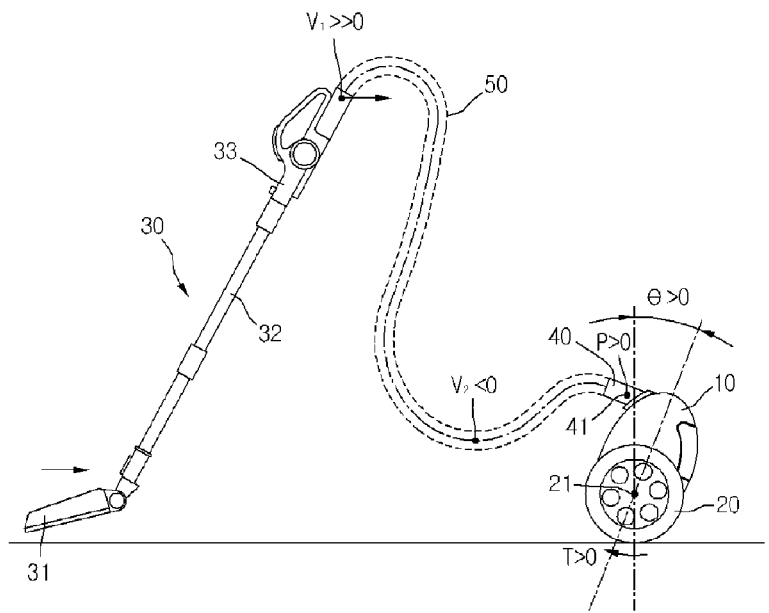
FIG. 6 is a side view of a vacuum cleaner with the suctioning apparatus moving rearward.

FIG. 6 is a side view of a vacuum cleaner with the suctioning apparatus moving rearward.

Referring to FIG. 6, when the suctioning apparatus is moved rearward, the handle 33 is moved at a high velocity $V_1>>0$, and the connecting hose 50 is separated from the ground surface. The connecting hose separated from the ground surface reaches a higher lowest velocity of $V_2>0$, and thus, the overall movement of the connecting hose 50 exerts a force $P>0$ on the center of the hose coupler 40

Thus, the force $P>0$ induces a change in the tilt of the main body 10, that is, a tilt of $\theta>0$. Here, the main body 10 tilts in a direction deviating from the suctioning nozzle 31.

As above, for the main body 10 to retain balance and follow the suctioning nozzle 31, a predetermined rotational force $T>0$ must be applied to the wheels 20. That is, the controller 81 controls the operation of the motors 70 to rotate the wheels 20 in a direction to move the main body 10 rearward.

Referring to FIGS. 3 to 6, the movement of the suctioning nozzle 31 for cleaning can disregard or negate a connecting hose having a predetermined weight and flexibility in contact with the floor, and a portion of the force applied to the main body 10 may become the approximate vector amount (P) of force applied to hose coupler 40.

Accordingly, in the controlling of the main body 10, an important affecting factor is the tilt $\theta$ of the central axis of the main body 10, and here, $\theta$ may be measured and analyzed using various methods.

Also, the position of the center of gravity of the main body 10 and the weight (W) thereof are important factors affecting the controlling of the main body 10.

Figure 7:
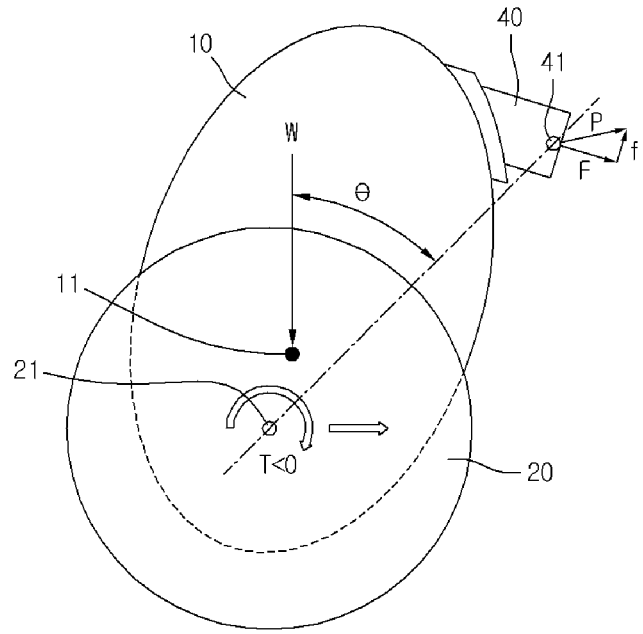
FIGS. 7 to 9 are side views showing the dynamic relationship of a main body for aligning a rotational center of a body with axes of wheels according to the first embodiment.
Figure 8:
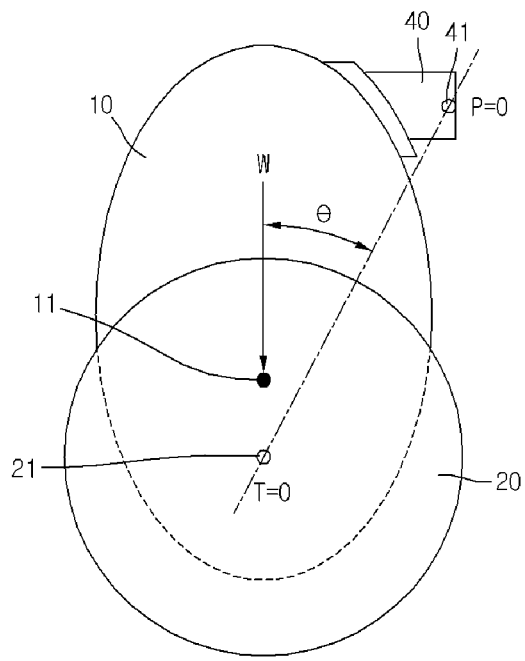
Figure 9:
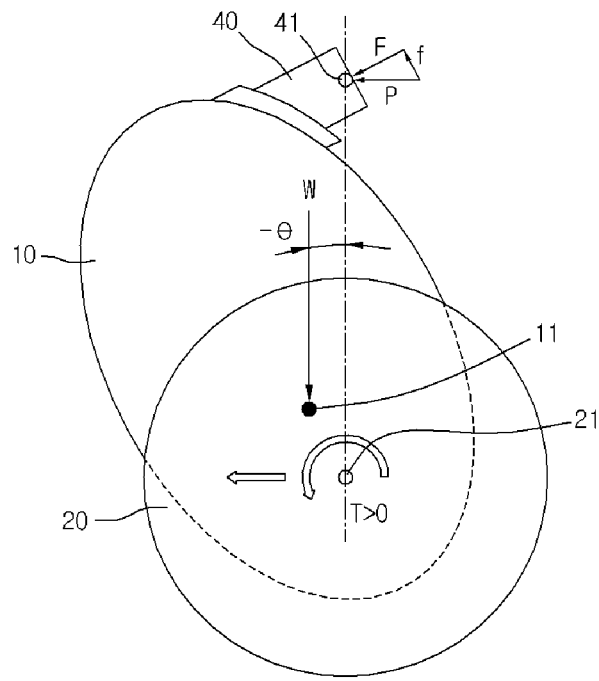

FIGS. 7 to 9 are side views showing the dynamic relationship of a main body for aligning a rotational center of a body with axes of wheels according to the first embodiment.

Referring to FIGS. 7 to 9, the rotating axis of the main body 10 and the axis 21 of the wheels are aligned, and the center of gravity 11 of the main body 10 is disposed higher than the rotating axis.

First, referring to FIG. 8, an unstably balanced state may be realized when the center of gravity 11 of the main body 10 is higher than the wheel axis 21. When the main body 10 is formed in an inverse pendulum configuration that is unstably balanced and if $P=0$, the rotational force T is not constantly maintained at 0, but the sensor 81 installed inside the main body 10 senses the amount of change $\theta$, and a small rotational force T forward and rearward is applied to prevent the main body 10 from toppling even in an unstably balanced state.

Here, $\theta$, for the sake of convenience, may be an angle set as a reference value for angles between the center 31 of the hose coupler 40 that is the central point to which force P is applied, a line connecting the wheel axes 21, and a gravitational line (vertical line). However, in order to measure $\theta$, the center 31 of the hose coupler and the line connecting the wheel axes 21 do not have to be used, and depending on requirements, an absolute angle with respect to a center of gravity sensed by the installed sensor may be used as a reference value.

FIGS. 7 and 9 show the unstably balanced main body in FIG. 8 rotating forward and rearward. In this case, because the main body rotates toward a direction in which the center of gravity 11 of the main body 10 is destabilized, the speed at which its center is set off balance increases, so that the rotating force T must be largely changed and applied quickly and precisely. In the present embodiment, the rotating direction of the main body 10 is based on the rotating direction of the hose coupler 40.

Referring to FIGS. 7 to 9, in the case of a main body with a high center and instability, the mobility of the main body 10 is increased, and a user can make fluid undulations forward and rearward during cleaning, for increased user satisfaction.

In the present embodiment, while the wheels are rotated according to the change in $\theta$, alternately, when the angle sensed by the sensor 80 falls within a predetermined range of angles, the controller 81 may disregard the angle within the angle range and maintain the motors 70 in stopped states, and operate the motors 70 when the angle falls outside the range of angles to move the main body.

Figure 10:
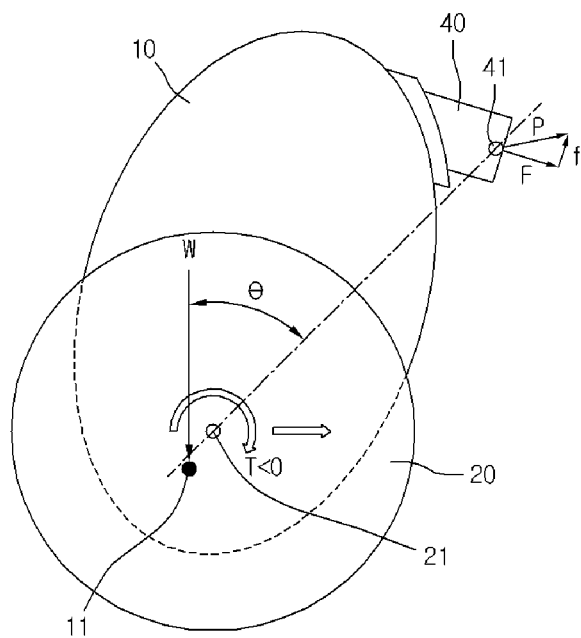
FIGS. 10 to 12 are side views showing the dynamic relationship of a main body for aligning a rotational center of a body with axes of wheels according to a second embodiment of the present disclosure.
Figure 11:
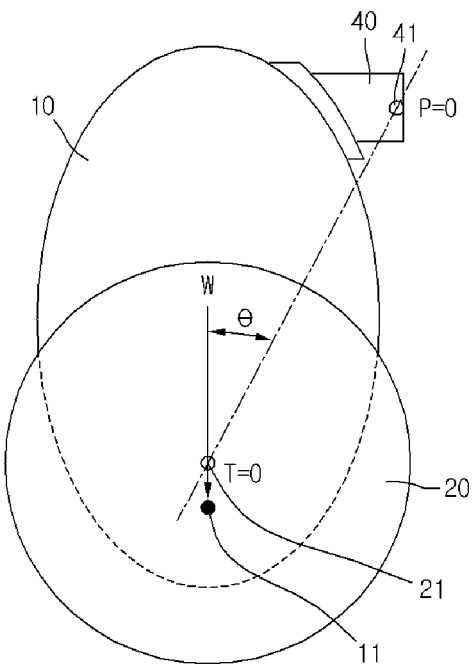
Figure 12:
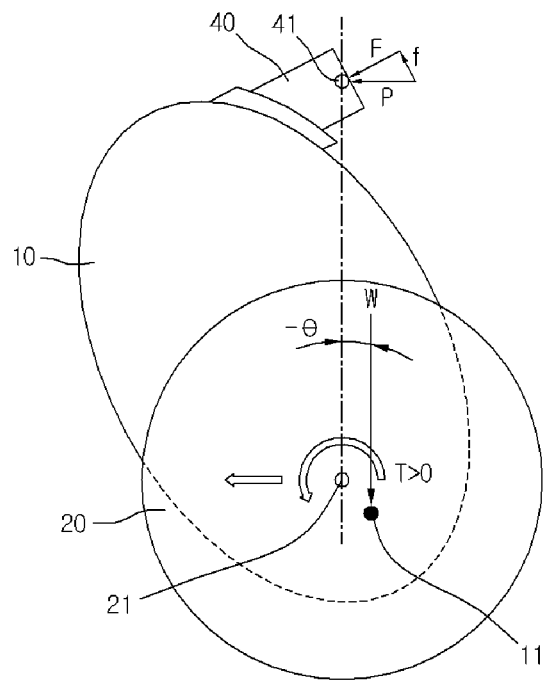

FIGS. 10 to 12 are side views showing the dynamic relationship of a main body for aligning a rotational center of a body with axes of wheels according to a second embodiment of the present disclosure.

Referring to FIGS. 10 to 12, the rotational center of the main body 10 and the axes 21 of the wheels are aligned, and the center of gravity 11 of the main body 10 is disposed lower than the rotational center.

As shown in FIG. 11, when the center of gravity 11 of the main body 10 is lower than the axes 21 of the wheels, a stably balanced state can be realized. When the main body 10 is thus configured in a stably balanced state, unlike in FIG. 8, when $P=0$, rotational force T can be maintained at 0, and here, the main body 10 maintains stability and resembles a roly-poly.

For the sake of convenience, the angle θ may be set as a reference value between the central point of the hose coupler 31 that is the central point at which force P is applied, a line connecting the axes 21 of the wheels, and a gravitational line (vertical line).

From a stably balanced state FIG. 11, the main body is shown rotated forward and rearward in FIGS. 10 and 12. In this case, the center of gravity 11 moves to the side opposite of the side in which the hose coupler 31 topples, so that recovering force is generated on the main body 10 and the center of balance is not easily upset. Thus, when θ changes slightly, there is no increase in the rotating force T.

Accordingly, the weight and center of gravity 11 of the main body 10 can be designed in the lower portion, so that sensing of small, intermittent changes to θ, that is, of cleaning movements will become more acute.

Accordingly, considering the description provided with reference to FIGS. 3 to 6 combined with the description provided with reference to FIGS. 7 to 12, when the connecting hose 50 is heavy and not very flexible, it is preferable to design the main body 10 having a low center of gravity 11 and being stably balanced, as in FIGS. 10 to 12. Conversely, when the connecting hose 50 is light with high flexibility, it is preferable to design the main body 10 to have a high center of gravity 11 and being unstably balanced, as in FIGS. 7 to 9.

Figure 13:
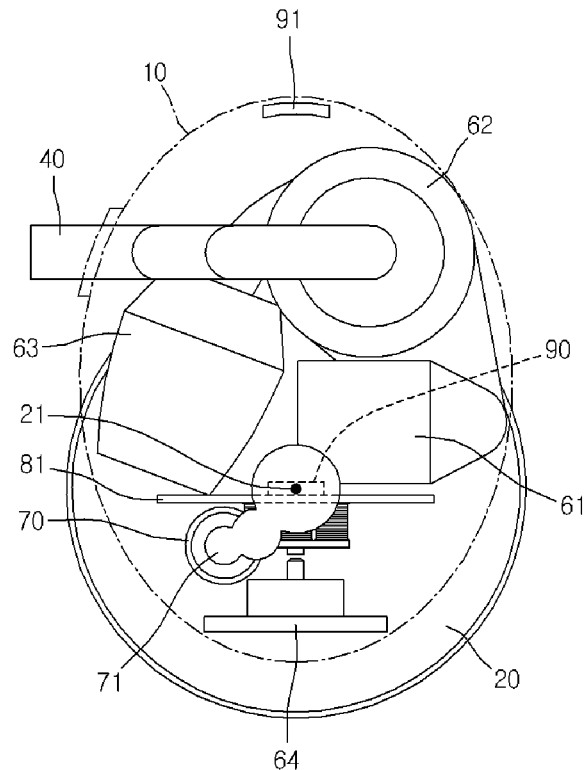
FIG. 13 is a side view of a vacuum cleaner according to a third embodiment of the present disclosure.

FIG. 13 is a side view of a vacuum cleaner according to a third embodiment of the present disclosure.

The present embodiment is the same as the first embodiment in all aspects except for a difference in the method for sensing movement of the main body. Therefore, only characteristically different aspects of the present embodiment will be described.

Referring to FIG. 13, a main body 10 according to the present embodiment includes a first sensor 90 and a second sensor 91 that sense displacement and acceleration of the main body 10.

The first sensor 90 is actually disposed on the same line as that between the axes 21 of the wheels, which moves the least. Thus, unreliability of angular acceleration signals (or displacement derived by integrating angular acceleration signals, in the case of a gyro-sensor) or acceleration signals can be minimized.

The second sensor 91 is disposed at the top of the main body, subject to the most movement.

The data sensed by each sensor 90 and 91 is relayed to the controller 81, and the controller controls the operation of the motors 70 according to the data sensed by the respective sensors 90 and 91.

Figure 14:
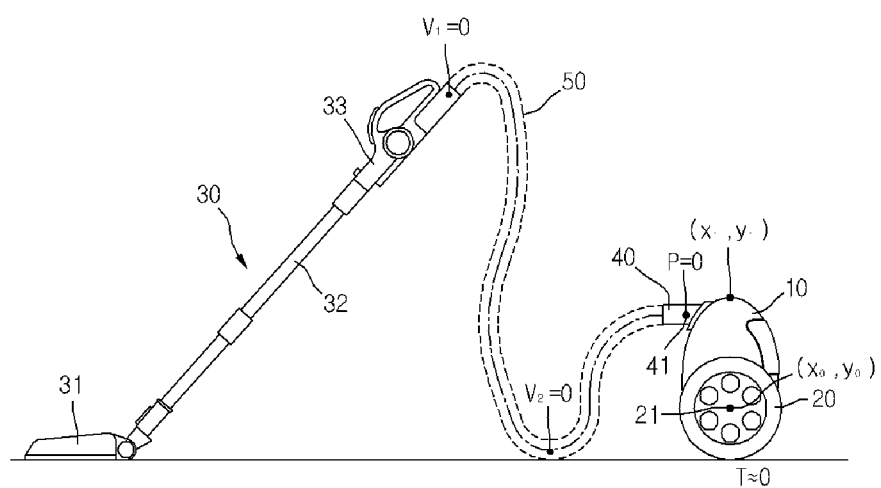
FIG. 14 is a side view of a vacuum cleaner in standby position according to the third embodiment.

FIG. 14 is a side view of a vacuum cleaner in standby position according to the third embodiment.

Referring to FIG. 14, when the vacuum cleaner is in standby mode, the connecting hose 50 is not subjected to movement, and the coordinates $(x_0, y_0)$ and $(x_1, y_1)$ on the main body 10 are also stationary.

Figure 15:
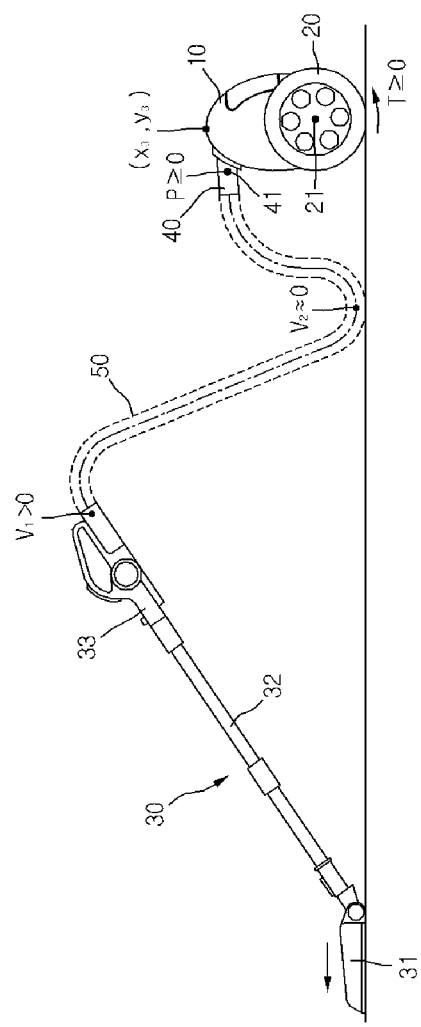
FIG. 15 is a side view of a vacuum cleaner when a user initiates cleaning.

FIG. 15 is a side view of a vacuum cleaner when a user initiates cleaning.

Referring to FIG. 15, the suctioning apparatus 30 is moved forward along a surface to be cleaned, so that the handle 33 moves at $V_1 > 0$, and a large amount of force from the movement of the handle 33 is absorbed by the point of the connecting hose 50 touching the ground (at which $V_2 \approx 0$), so that a nominal amount of force ($P \geq 0$) is transferred to the center 41 of the hose coupler.

Here, of the two points on the main body 10 with coordinates $(x_0, y_0)$ and $(x_1, y_1)$, there is no change in the coordinates $(x_0, y_0)$ disposed at the axes 21 of the wheels, and the coordinates $(x_1, y_1)$ of the point at the top of the main body 10 are shifted slightly in position to $(x_3, y_3)$. Thus, to compensate for the changed signal, the wheels 20 are rotated slightly by applying a rotating force (torque) of $T \geq 0$. However, in this case, the wheels 20 are barely rotated, so that the main body 10 is not moved forward or rearward, but is maintained in an upright position—in other words, an unmoving posture is maintained by the main body when the connecting hose 50 is moved to perform cleaning.

Figure 16:
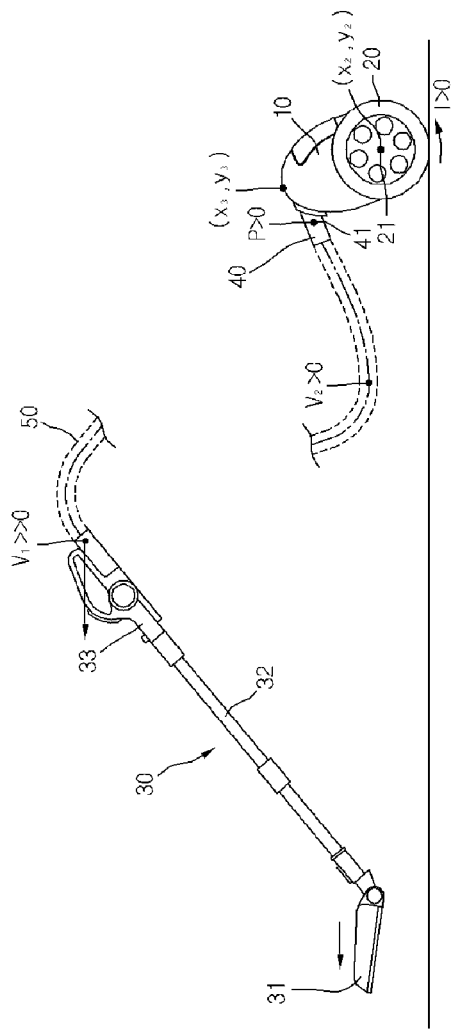
FIG. 16 is a side view of a vacuum cleaner with the suctioning apparatus moving forward.

FIG. 16 is a side view of a vacuum cleaner with the suctioning apparatus moving forward.

Referring to FIG. 16, when the suctioning nozzle 31 is being moved while lifted from a surface to be cleaned, the handle 33 is moved at a velocity of $V_1 \gg 0$. Therefore, the connecting hose 50 is lifted off the ground.

The portion of the connecting hose 50 on the ground increases from the minimum velocity of 0 to $V_2 > 0$, and because the entire connecting hose 50 is moved, the center 41 of the hose coupler receives a force of $P > 0$.

Also, the force $P > 0$ induces the two points with coordinates $(x_0, y_0)$ and $(x_1, y_1)$ to move to positions with coordinates $(x_2, y_2)$ and $(x_3, y_3)$, respectively.

Accordingly, in order for the main body 10 to retain balance and follow the suctioning nozzle 31, a predetermined rotating force of $T > 0$ must be applied to the wheels 20. That is, the controller 81 controls the operation of the motors 70 to rotate the wheels 20 in directions to move the main body 10 forward.

The wheels 20 are moved by torque (T) so that the balance of the main body 10 is not upset and the main body 10 follows the suctioning nozzle 31 or the connecting hose 50. Thus, a user does not have to exert a large force to pull the main body 10.

Figure 17:
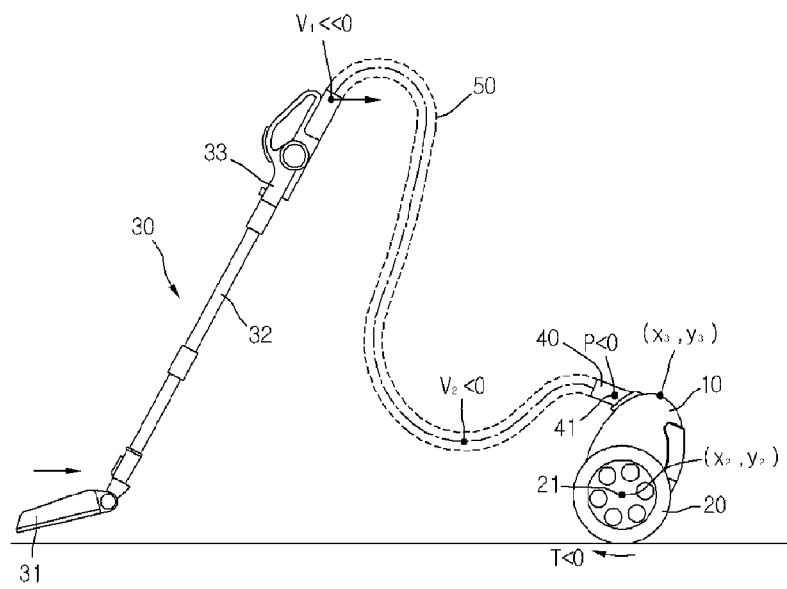
FIG. 17 is a side view of a vacuum cleaner with the suctioning apparatus moving rearward.

FIG. 17 is a side view of a vacuum cleaner with the suctioning apparatus moving rearward.

Referring to FIG. 17, when the suctioning nozzle 31 is being moved rearward, the handle 33 is moved at a velocity of $V_1 \gg 0$, and the connecting hose 50 is lifted up from the ground. Therefore, the velocity of the connecting hose 50 separated from the ground increases to $V_2 > 0$ from a minimum velocity of 0, and the movement of the entire connecting hose 50 exerts a force of $P > 0$ on the center 41 of the hose coupler.

The force $P > 0$ changes the tilt of the main body 10, or induces $\theta > 0$. Here, the main body 10 tilts away from the suctioning nozzle 31.

Accordingly, to allow the main body 10 to retain balance and follow the suctioning nozzle 31, a predetermined rotating force $T > 0$ must be applied to the wheels 20. That is, the controller 81 controls the operation of the motors 70 to rotate the wheels 20 in directions to move the main body 10 rearward.

Figure 18:
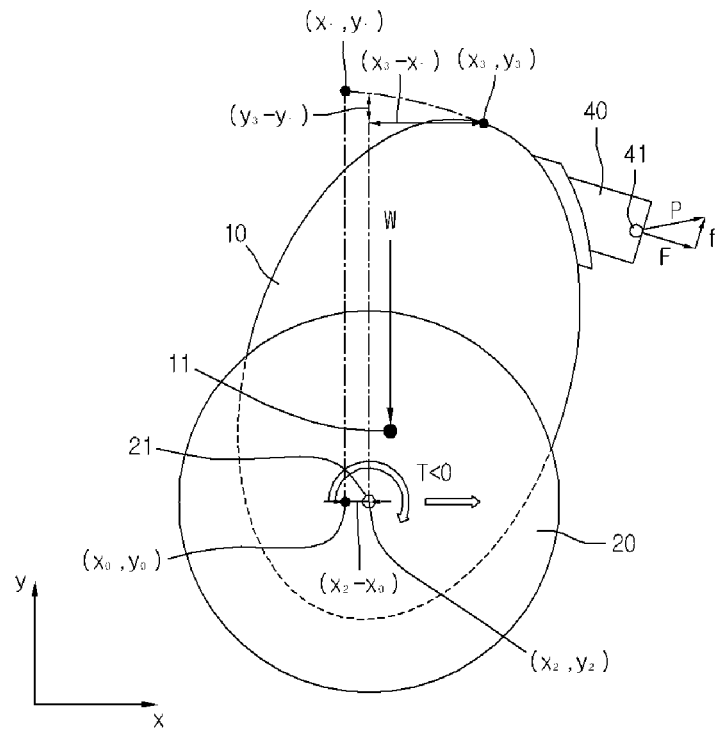
FIGS. 18 to 20 are side views showing the dynamic relationship of a main body for aligning a rotational center of a body with axes of wheels according to the third embodiment.
Figure 19:
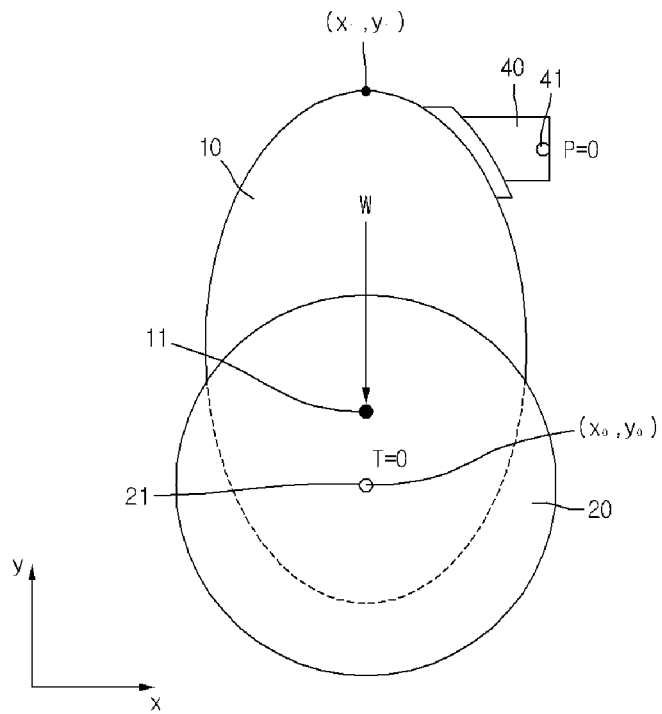
Figure 20:
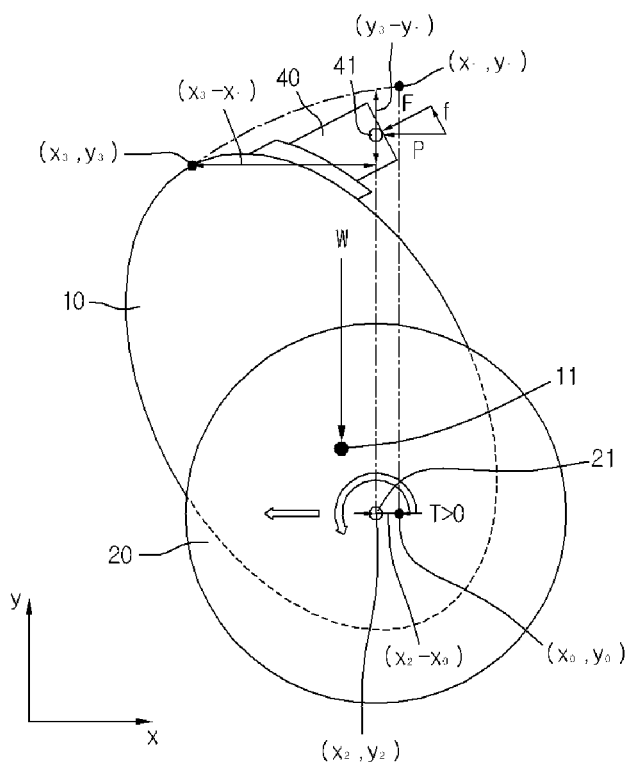

FIGS. 18 to 20 are side views showing the dynamic relationship of a main body for aligning a rotational center of a body with axes of wheels according to the third embodiment.

In FIGS. 18 to 20, the rotational center of the main body 10 is aligned with the axis 21 of the wheel, and the center of gravity 11 of the main body 10 is disposed higher than the rotating center.

Referring to FIGS. 18 to 20, to sense the absolute displacement of two points on the main body 10 with coordinates of $(x_1, y_1)$ and $(x_0, y_0)$, the sensors 90 and 91 used may be gyro-sensors for plotting coordinates and sensing the cumulative current angle and velocity of the main body 10 during its operation.

When a moving member that is a gyro-sensor spins, a coriolis force is applied perpendicularly to the spinning direction. A gyro-sensor uses this physical phenomenon to sense angular velocity, and is thus capable of sensing not only a change in angle through accumulating changes beginning at an initial reference point, but also positional change.

Next, to sense relative changes of $(x_1, y_1)$ and $(x_0, y_0)$, acceleration sensors for measuring sensed data according to the equation of motion (F=ma) that is based on force are used. Then, the sensed amount of acceleration pertaining to a cumulative position from a certain time is integrated, respective velocities of both points are obtained, and these are integrated again to calculate the displacements of the respective points.

Here, the two positions of points with coordinates $(x_1, y_1)$ and $(x_0, y_0)$ may, for example, be selected because the point $(x_0, y_0)$ is one that is displaced the least, and $(x_1, y_1)$ is the point that is displaced the most, in terms of rotating motion of the main body 10 when force P is exerted thereon.

In order to sense relative displacements of certain points (referred to below as the first point and the second point) as quickly and accurately as possible, when the displacement of the second point is derived based on the first point, the first point may be set as a reference point $(x_0, y_0)$ from all the geometric points on the main body 10, at which only rotation occurs and translation movement occurs the least. The second point may be set as a comparison point of $(x_1, y_1)$ that is subject to both rotation and the largest amount of translation, or the point on the main body furthest from the rotational center.

Also, the controller, by integrating acceleration data sensed on two occasions, can derive the horizontal displacement $(x_3-x_1)$ and the vertical displacement $(y_3-y_1)$, and then derive the current angle data from the displacement data.

According to the derived relative displacement data and the current angle data, the controller 81 controls the operation of the motors 70 to move the main body 10 forward or rearward.

While in the present embodiment, the relative displacement data of the two points on the main body is used to sense the rotational movement of the main body, alternatively, relative speed data of two points on the main body may be used to sense the rotational movement of the main body.

Figure 21:
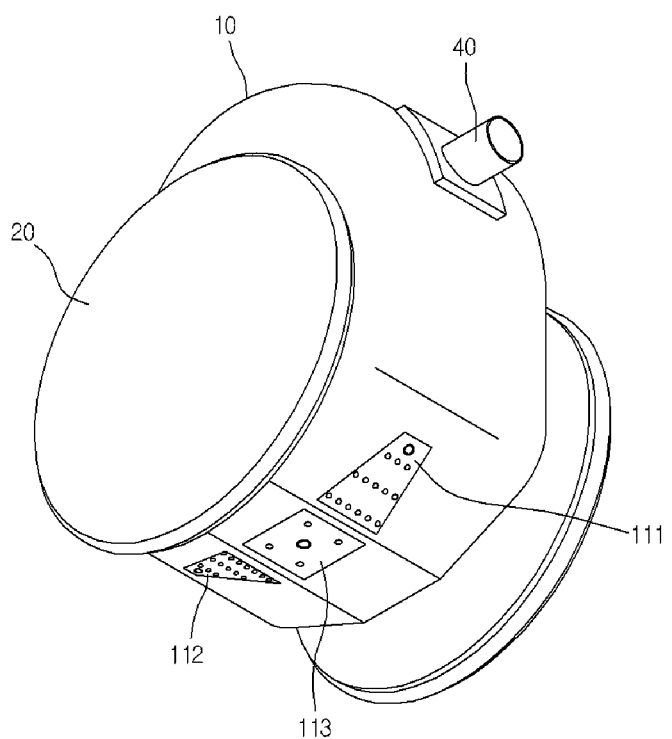
FIG. 21 is a side view of a vacuum cleaner according to a fourth embodiment of the present disclosure.

FIG. 21 is a side view of a vacuum cleaner according to a fourth embodiment of the present disclosure.

The present embodiment is the same as the first embodiment in all aspects except for a difference in the method for sensing movement of the main body. Therefore, only characteristically different aspects of the present embodiment will be described.

Referring to FIG. 21, a plurality of sensors is provided on the bottom of the main body 10 to detect the distance between the main body and a surface to be cleaned.

In detail, the plurality of sensors includes a central sensor 113 disposed on a vertical line connecting the wheels 21 and the surface to be cleaned 21, a front sensor 111 disposed at the front of the central sensor 113, and a rear sensor 112 disposed behind the central sensor 113.

The central sensor 113 may be attached at a point closest to the surface to be cleaned when the main body 10 is in a stable position (not necessarily meaning a vertical position) or in a vertical position. The respective sensors include one light emitter (LE) and a plurality of photo detectors (PD). Also, the number of PDs disposed in directions parallel to the axes of the wheels may be increased at areas where the overall light paths including reflections from a surface to be cleaned become more distant.

For example, in the case of the front sensor 111, rows of 3, 4, and 5 PDs may be respectively aligned side by side, parallel to the rotational shaft, to allow the light emitted from the LE to be scattered laterally at the surface to be cleaned and still be sufficiently sensed.

Figure 22:
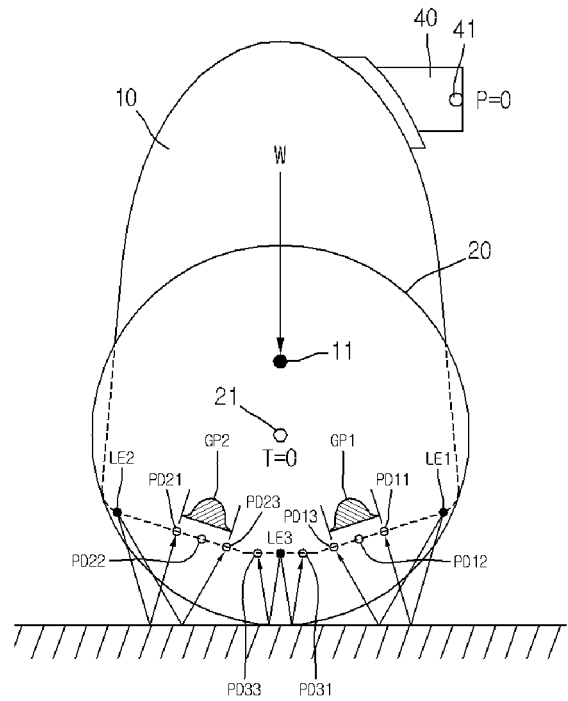
FIGS. 22 to 24 are side views showing the dynamic relationship of a main body for aligning a rotational center of a body with axes of wheels according to the fourth embodiment.
Figure 23:
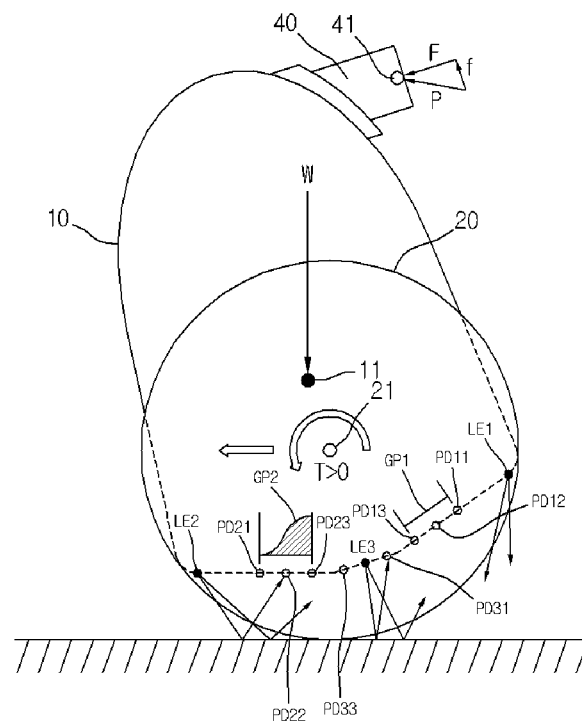
Figure 24:
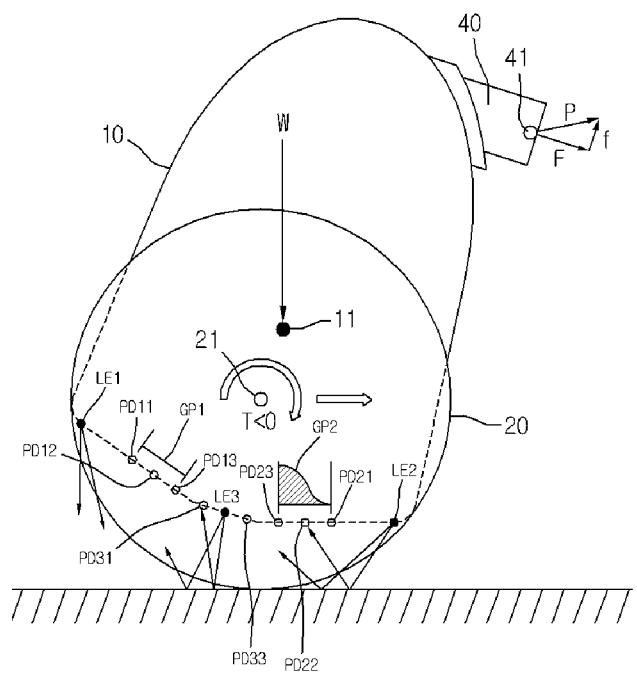

FIGS. 22 to 24 are side views showing the dynamic relationship of a main body for aligning a rotational center of a body with axes of wheels according to the fourth embodiment.

In FIGS. 22 to 24, the rotational center of the main body 10 aligns with the axes 21 of the wheels, and the center of gravity 11 of the main body 10 is disposed lower than the rotational center.

Referring to FIGS. 22 to 24, one third LE (LE3) and more than one PD (PD31 and PD33) disposed to the front and rear, respectively, of LE3 are provided at the central undersurface of the main body 10. Also, at the front undersurface and the rear undersurface of the main body, one LE (LE1 and LE2) and three rows of one or more PDs are arranged in front-to-rear directions, respectively.

The LE3 and the PD31 and PD33 disposed at the center in FIG. 22 are used as reference devices for setting a reference sensitivity of PDs according to various reflectivities of different surfaces to be cleaned.

While FIG. 22 shows the light emitted from LE1 emitted to PD11 and up to PD13, this is a representation taking into account light dispersion, and a more accurate light distribution intensity between PD11 and PD13 follows the Gaussian Profile, that is GP1.

Accordingly, when the main body 10 is upright or stationary, the light emitted from LE1 is targeted to PD12 at which the highest intensity of light is detected, and the light detected by PD11 and PD13 (while not a 0 value) is minimal. (This also applies to devices LE2 and PD21 to PD23 at the rear of the main body.)

FIGS. 23 and 24 show the main body in FIG. 22 rotating forward and rearward. FIG. 23 shows the main body tilted rearward, whereupon, in terms of the light intensity received by PD21 to PD23 according to emitted angles of light from LE2, PD21 cannot sense any light, and the center of light reflected from the surface to be cleaned is defined near PD23.

Accordingly, the distribution of light is as shown by GP2 in FIG. 23, and here, the travelling distance of the overall light is short (when incident on a hard surface to be cleaned) so that the intensity of reflected light is high, making the maximum value of GP2 in FIG. 23 greater than the maximum value of GP2 in FIG. 22.

Conversely, with respect to LE1, the distance between the main body 10 and the surface to be cleaned is greater, so that the actual light distribution to PD11 to PD13 can be said to be 0.

In the above case, the controller 81 detects rearward rotation of the main body 10, and controls the motors 70 to rotate the wheels 20 to move the main body 10 in a rearward direction.

Of course, in the description above, the amount of external light or natural light already incident on the space to be cleaned has not been considered, and in order to achieve easy sensing of light as above in a wide range of areas to be cleaned and under various light conditions in areas to be cleaned, the light intensity of LE1 and LE2 and the photo detecting sensitivity of PD11 to PD23 may be controlled to achieve a desired level for LE3 and PD31 to PD33.

In FIG. 23, PD33 that provides a reference sensitivity does not have light incident thereon, and this data may be used in addition to the sensing of the rotational movement of the main body 10.

FIG. 24 shows the opposite of FIG. 23. In FIG. 24, the controller 81 senses the forward rotation of the main body 10, and controls the motors 70 to rotate the wheels 20 to move the main body 10 forward.

Figure 25:
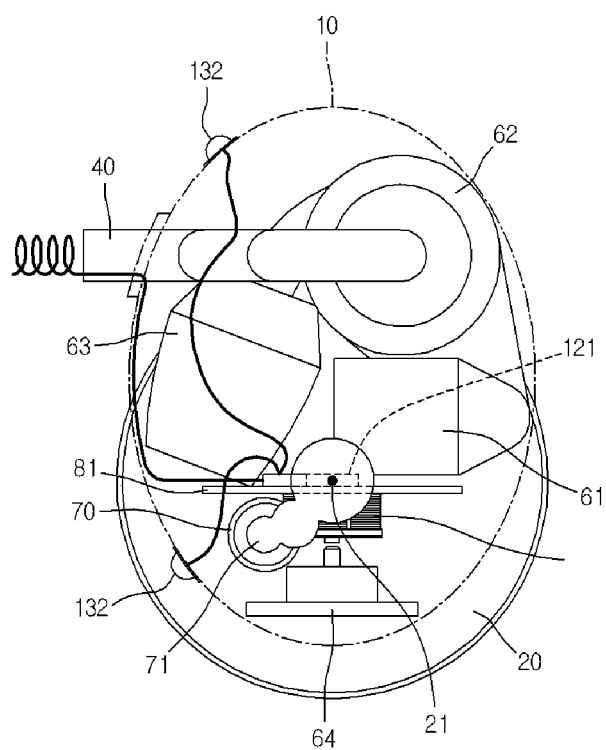
FIG. 25 is a side view of a vacuum cleaner according to a fifth embodiment of the present disclosure.
Figure 26:
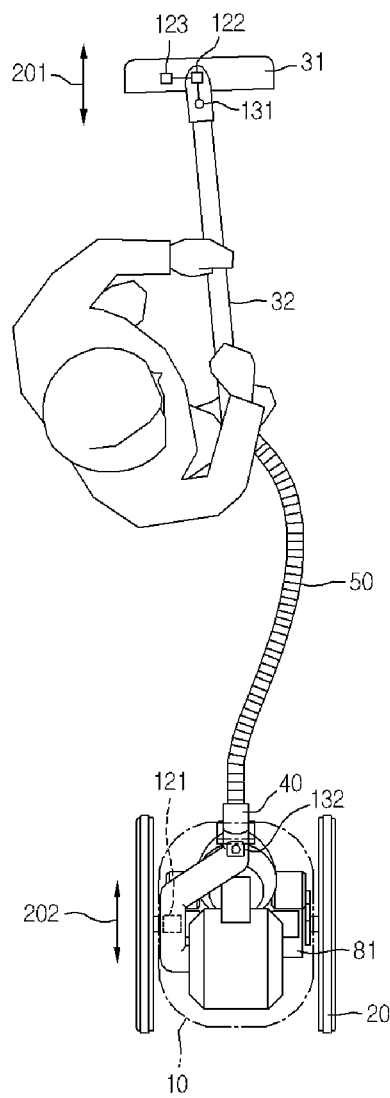
FIG. 26 is a diagram showing positions of a suctioning nozzle and a main body when a user moves forward and rearward or cleans with a forward and rearward movement.

FIG. 25 is a side view of a vacuum cleaner according to a fifth embodiment of the present disclosure, and FIG. 26 is a diagram showing positions of a suctioning nozzle and a main body when a user moves forward and rearward or cleans with a forward and rearward movement.

Referring to FIGS. 25 and 26, a main body sensor 121 is provided on the main body 10 according to the present embodiment, to sense acceleration when the main body 10 moves parallelly to a surface to be cleaned. The movement of the main body sensor 121 is disposed on the same line with the axes 21 of the wheels, which moves the least when the main body 10 rotates.

In the present embodiment, the suctioning nozzle 31 includes a first sensor 122 for sensing the acceleration of the suctioning nozzle 31 when it is moved in a direction parallel to a surface to be cleaned, a second sensor 123 sensing the acceleration of the suctioning nozzle 31 when it is moved in a direction perpendicular to a surface to be cleaned, and a transmitter 131 for transmitting data sensed by the respective sensors 122 and 123 to the main body 10.

Also, the main body 10 is provided with a plurality of receivers 132 for receiving the signals transmitted from the transmitter 131. The receivers 132 may be provided in singularity or more at both the top and bottom of the main body 10.

In FIG. 26, a user grasps the connecting tube 32 and the handle 33 and performs forward and rearward movements or performs cleaning in a forward-rearward direction.

In this case, the controller 81 compares the forward acceleration change 201 of the suctioning nozzle 31 and the rearward acceleration change 202 of the main body 10, and controls the operation of the driving unit to maintain the distance between the main body and the suctioning nozzle. In FIG. 26, the wheels 20 are rotated in a direction to move the main body 10 forward.

Figure 27:
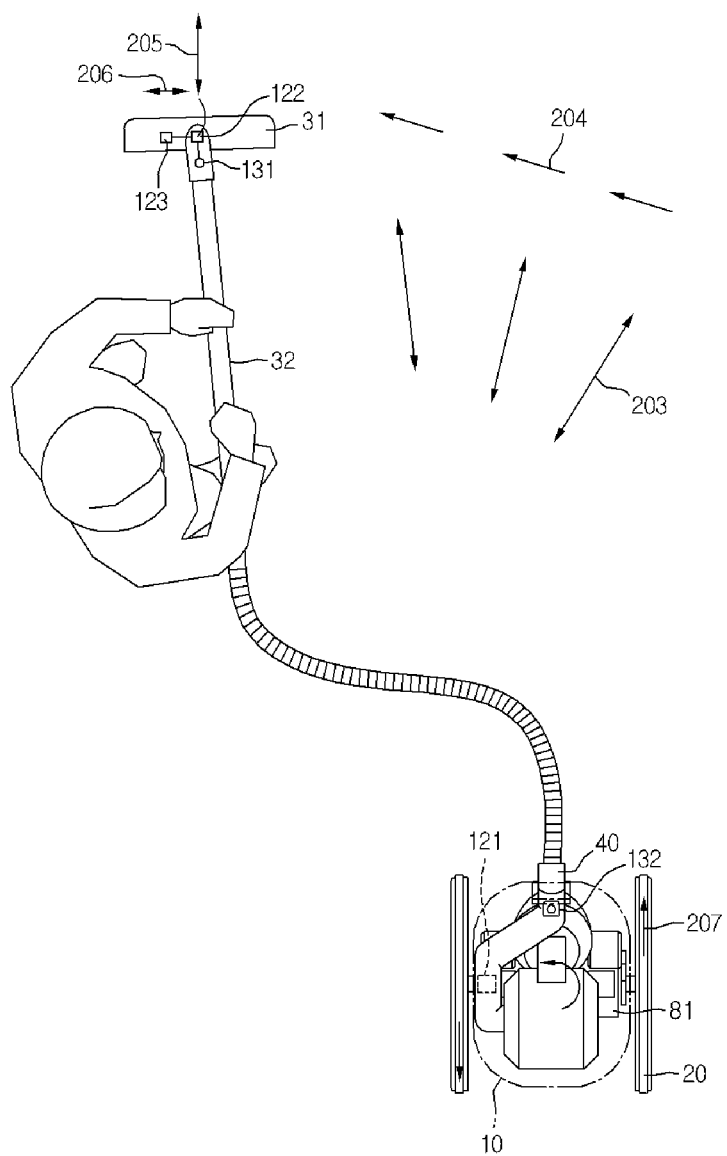
FIG. 27 is a diagram showing acceleration components and positions of a suctioning nozzle and a main body when a user performs cleaning by gradually moving to the left.

FIG. 27 is a diagram showing acceleration components and positions of a suctioning nozzle and a main body when a user performs cleaning by gradually moving to the left.

Referring to FIG. 27, the size of a forward acceleration 205 applied to the suctioning nozzle 31 is less than the size of a lateral acceleration 206 applied to the suctioning nozzle 31. Also, the acceleration applied to the main body 10 is 0.

When the above movements are performed, the suctioning nozzle 31 performs cleaning in a forward-rearward direction and moves slightly to the left 204. Here, there is no significant change in the current angle orientations of the main body 10 and the suctioning nozzle 31, so that the right wheel 20 is rotated forward 207 to rotate the main body 10 in place in preparation for the next step.

In other words, when the first sensor 122 relays data on a large-scale forward-rearward movement 205 and a small-scale leftward movement 206 to the controller 81, and the body sensor 121 relays acceleration data within a certain range to the controller 81, the controller 81 controls the operation of the motors 70 to rotate the main body 10 to one of a left and right side of the suctioning nozzle.

Figure 28:
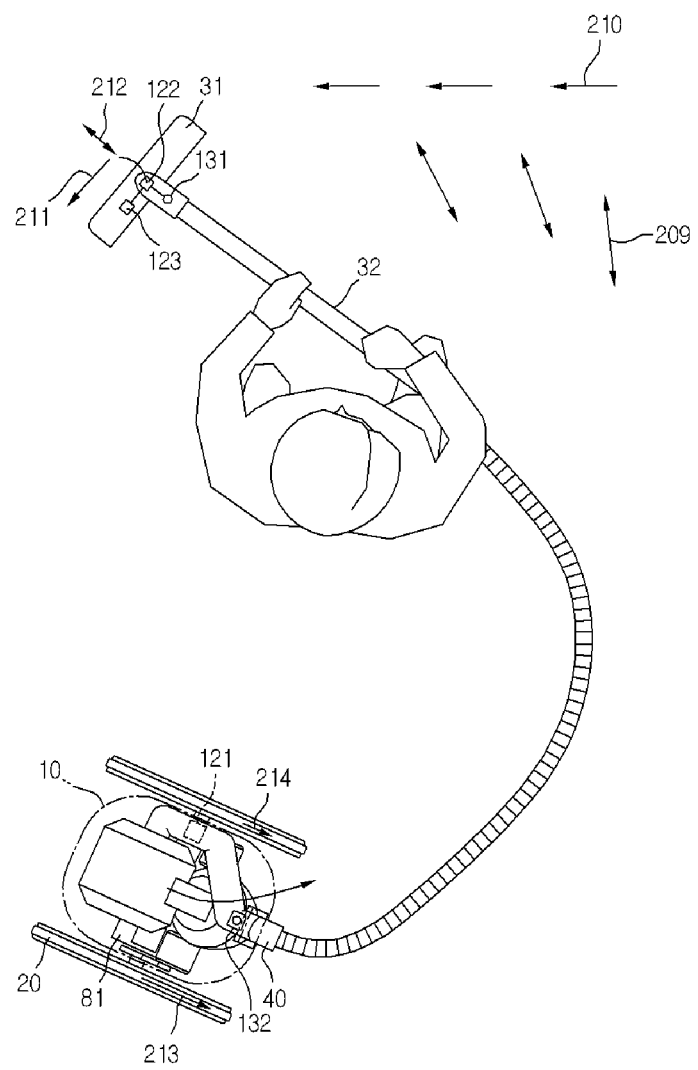
FIG. 28 is a diagram showing acceleration components and positions of a suctioning nozzle and a main body when a user performs cleaning by performing large pivoting motions to the left.

FIG. 28 is a diagram showing acceleration components and positions of a suctioning nozzle and a main body when a user performs cleaning by performing large pivoting motions to the left.

Referring to FIG. 28, unlike in FIG. 27, the forward-rearward acceleration 212 applied to the suctioning nozzle 31 is small, and the lateral acceleration 211 applied to the suctioning nozzle 31 is comparatively large.

When the above movements are performed, the suctioning nozzle 31 draws tracks of cleaning motions leftward (to the left in FIG. 28) for the large motions of cleaning 209+moving 210. Here, the respective current angular positional data of the main body 10 and the suctioning nozzle 31 experience a large change, and when a more sudden rotation of the suctioning nozzle 31 is performed, the suctioning nozzle 31 and the main body 10 may assume opposite positions, as shown in the diagram.

In this case, in order for the main body 10 to be disposed in the same direction as the suctioning nozzle 31 and disposed behind the suctioning nozzle 31, the right wheel rotates quickly forward 213, and the left wheel rotates comparatively slower forward 214, to move the main body 10 forward to the left.

In other words, the first sensor 122 relays data on a small forward-rearward movement 209 and a large leftward cumulative movement 210 to the controller 81, and when acceleration data within a predetermined range is relayed from the main body sensor 121 to the controller 81, the controller 81 controls the operation of the motors 70 to turn the main body 10 to the left and move it forward quickly.

Figure 29:
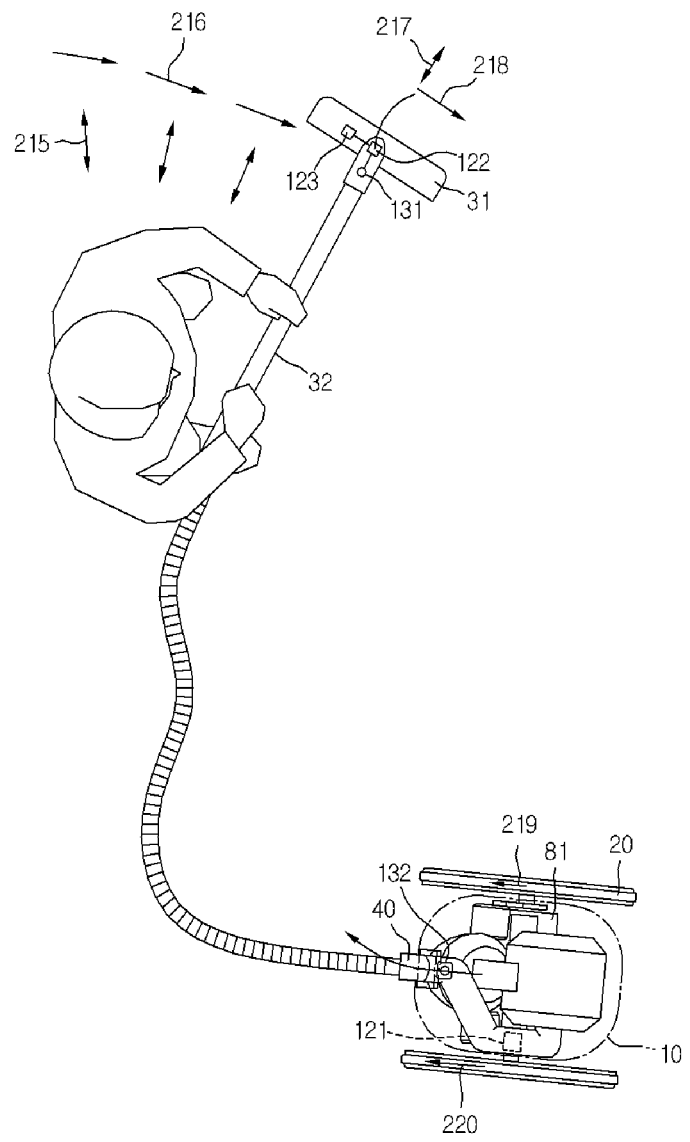
FIG. 29 is a diagram showing acceleration components and positions of a suctioning nozzle and a main body when a user performs cleaning by performing large pivoting motions to the right.

FIG. 29 is a diagram showing acceleration components and positions of a suctioning nozzle and a main body when a user performs cleaning by performing large pivoting motions to the right. FIG. 29 is the opposite case of FIG. 28.

Referring to FIG. 29, the first sensor 122 relays data on a small forward-rearward movement 215 and a large rightward cumulative movement 216 to the controller 81, and when acceleration data within a predetermined range is relayed from the main body sensor 121 to the controller 81, the controller 81 controls the operation of the motors 70 to turn the main body 10 to the right and move it forward quickly.

Figure 30:
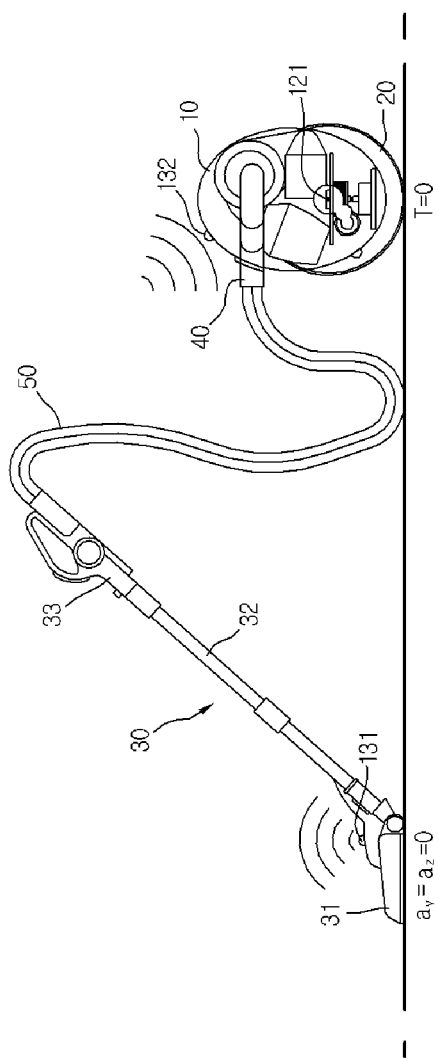
FIG. 30 is a side view of a vacuum cleaner in standby position according to the fifth embodiment.

FIG. 30 is a side view of a vacuum cleaner in standby position according to the fifth embodiment.

Referring to FIG. 30, the suctioning nozzle 31 and the main body 10 are in a stopped state. Accordingly, the forward-rearward and vertical acceleration of the suctioning nozzle 31 is 0 where $(a_y=a_z=0)$, and the forward-rearward acceleration of the main body 10 is also 0. In this case, the main body 10 is maintained in a stopped state.

Figure 31:
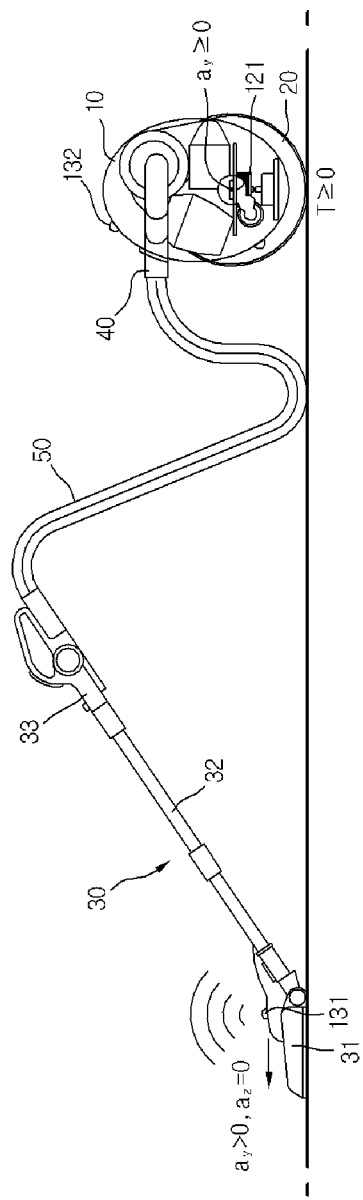
FIG. 31 is a side view of the vacuum cleaner in FIG. 30 when the suctioning nozzle is pushed forward.

FIG. 31 is a side view of the vacuum cleaner in FIG. 30 when the suctioning nozzle is pushed forward.

Referring to FIG. 31, when the acceleration of the suctioning nozzle is $a_y>0$, where $a_z=0$, or when short, repetitive movements such as cleaning movements are performed, because the flexible connecting hose 50 absorbs the forward-rearward motion of the suctioning nozzle 31, the acceleration of the main body is minimal at $a_y \geq 0$.

In the above state, when a difference arises in the cumulative data sensed by the first sensor 122 and the main body sensor 121 over time, the controller 81 analyzes the cumulative amount of the sensed data over time, and determines whether the suctioning nozzle is currently cleaning or being moved (or being rotated).

For example, in the state of cleaning shown in FIG. 31, to prevent a user being impeded while cleaning, the controller may control the motors 70 by applying a small rotating force of T≥0 thereto to enable the main body 10 to maintain a predetermined distance from the suctioning nozzle 31.

Figure 32:
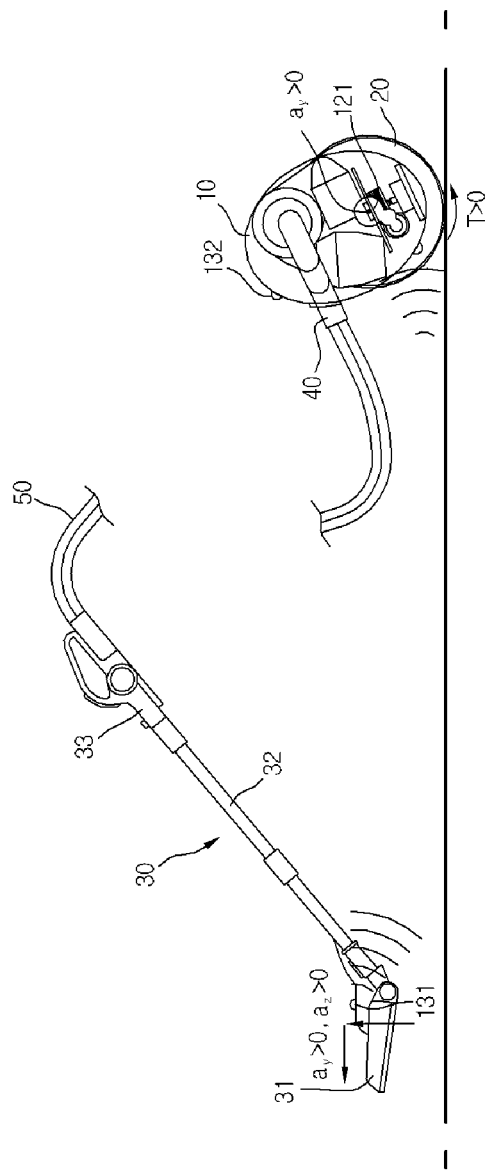
FIG. 32 is a side view of the vacuum cleaner in FIG. 30 when the suctioning nozzle is picked up and moved forward.

FIG. 32 is a side view of the vacuum cleaner in FIG. 30 when the suctioning nozzle is picked up and moved forward.

Referring to FIG. 32, when a user lifts the suctioning nozzle 31, the suctioning nozzle 31 has an initial vertical acceleration of $(a_z>0)$ and a horizontal acceleration of $(a_y>0)$.

Here, when the connecting hose 50 is pulled, the main body 10 may be either tilted forward or pulled forward, and the horizontal acceleration in both directions of the suctioning nozzle 31 is increased to $a_y>0$ that is the horizontal acceleration sensed by the main body sensor 121.

In the above state, the controller 81 controls the operation of the motors 70 to enable the main body 10 to follow the suctioning nozzle 31.

Figure 33:
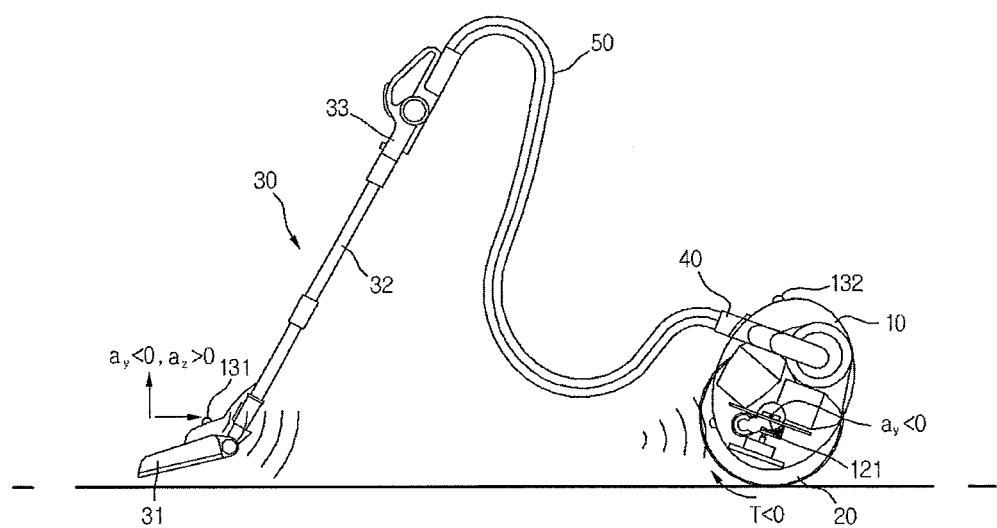
FIG. 33 is a side view of the vacuum cleaner in FIG. 30 when the suctioning nozzle is picked up and moved rearward.

FIG. 33 is a side view of the vacuum cleaner in FIG. 30 when the suctioning nozzle is picked up and moved rearward.

Referring to FIG. 33, when a user lifts the suctioning nozzle 31, the suctioning nozzle 31 has an initial vertical acceleration of ($a_z>0$) and a horizontal acceleration of ($a_y<0$).

Here, as the connecting hose 50 is biased rearward, the main body 10 may be tilted rearward or pushed rearward, and the horizontal acceleration in a negative direction of the suctioning nozzle 31 is increased to $a_y<0$ that is the horizontal acceleration sensed by the main body sensor 121.

In this state, the controller 81 controls the operation of the motors 70 to move the main body 10 rearward.

The invention claimed is:

1. A vacuum cleaner comprising:
 a main body capable of rotating with respect to a rotational center extending in a horizontal direction;
 a suctioning nozzle connected to the main body;
 a wheel for moving the main body;
 a driving unit for driving the wheel;
 a sensor for sensing rotation of the main body; and
 a controller for controlling the driving unit according to data sensed by the sensor,
 wherein, when the main body tilts in a direction closer toward the suctioning nozzle, the controller controls the operation of the driving unit to rotate the wheel in a direction to move the main body forward, and
 wherein, when the main body tilts in a direction deviating from the suctioning nozzle, the controller controls the operation of the driving unit to rotate the wheel in a direction to move the main body rearward.

2. The vacuum cleaner according to claim 1, wherein an axis of the wheel is the same as the rotational center.

3. The vacuum cleaner according to claim 1, wherein the axis of the wheel and a center of gravity of the main body are separated from each other.

4. The vacuum cleaner according to claim 1, wherein the main body comprises a hose connector provided at a position higher than the rotational center.

5. The vacuum cleaner according to claim 1, wherein the sensor senses a rotated angle of the main body.

6. The vacuum cleaner according to claim 1, wherein the sensor senses a relative displacement or a relative velocity between a first portion separated from the rotational center of the main body and the rotational center.

7. The vacuum cleaner according to claim 1, wherein the sensor senses a change in distance between the main body and a surface to be cleaned.

8. A vacuum cleaner comprising:
 a main body having one or more of a rotational center extending in a horizontal direction;
 a hose connector provided on the main body in a position apart from the rotational center;
 a suctioning nozzle connected to the hose connector;
 a wheel for moving the main body;
 a driving unit for driving the wheel;
 a sensor for sensing rotational movement of the main body; and
 a controller for controlling an operation of the driving unit according to data sensed by the sensor,
 wherein, when the main body tilts in a direction closer toward the suctioning nozzle, the controller controls the operation of the driving unit to rotate the wheel in a direction to move the main body forward, and
 wherein, when the main body tilts in a direction deviating from the suctioning nozzle, the controller controls the operation of the driving unit to rotate the wheel in a direction to move the main body rearward.

9. The vacuum cleaner according to claim 8, wherein the hose connector is provided at a position higher than a center of gravity of the main body.

10. The vacuum cleaner according to claim 8, wherein an axis of the wheel provides the rotational center of the main body and supports the main body.

11. The vacuum cleaner according to claim 8, wherein the wheel rotates in the same direction as a rotated direction of the main body.

12. The vacuum cleaner according to claim 8, wherein the sensor senses a rotated angle of the main body, and
 the controller stops the driving unit when the rotated angle of the main body falls within a predetermined range, and operates the driving unit when the rotated angle of the main body exceeds the predetermined range.

13. A vacuum cleaner comprising:
 a main body having a rotational center extending in a horizontal direction;
 a suctioning nozzle connected to the main body;
 a wheel for moving the main body;
 a driving unit for driving the wheel;
 a sensor for sensing a change in distance between the main body and a surface to be cleaned, according to a rotation of the main body; and
 a controller for controlling an operation of the driving unit according to data sensed by the sensor,
 wherein, when the main body tilts in a direction closer toward the suctioning nozzle, the controller controls the operation of the driving unit to rotate the wheel in a direction to move the main body forward, and
 wherein, when the main body tilts in a direction deviating from the suctioning nozzle, the controller controls the operation of the driving unit to rotate the wheel in a direction to move the main body rearward.

14. The vacuum cleaner according to claim 13, wherein the sensor is disposed in a plurality of positions apart from one another on the main body.

15. The vacuum cleaner according to claim 13, wherein the sensor comprises a light emitter and a photo detector for detecting light emitted from the light emitter.

16. A vacuum cleaner comprising:
 a main body provided with a first movement sensor and a plurality of wheels;
 a suctioning apparatus connected to the main body, to suction air including dust from a surface to be cleaned and transferring the suctioned air including dust to the main body;
 a second movement sensor provided on the suctioning apparatus;
 a transmitter configured to transmit data sensed by the second movement sensor and provided to the suctioning apparatus;
 a receiver configured to receive data transmitted from the transmitter and provided to the main body;
 a driving unit for driving each of the wheels; and
 a controller for controlling an operation of the driving unit according to data sensed by each of the movement sensors,
 wherein each movement sensor comprises an acceleration sensor, and
 wherein the driving unit includes a plurality of motors for driving the wheels, respectively, and axes of the respective motors are rotated at the same speed or at different speeds according to data sensed by each of the movement sensors.

* * * * *